H. RICHARDSON.
CAR UNLOADER.
APPLICATION FILED MAY 28, 1919.

1,364,808.

Patented Jan. 4, 1921.
11 SHEETS—SHEET 1.

Inventor
Henry Richardson,
By
Attorney

Witnesses

H. RICHARDSON.
CAR UNLOADER.
APPLICATION FILED MAY 28, 1919.
1,364,808.
Patented Jan. 4, 1921.
11 SHEETS—SHEET 3.
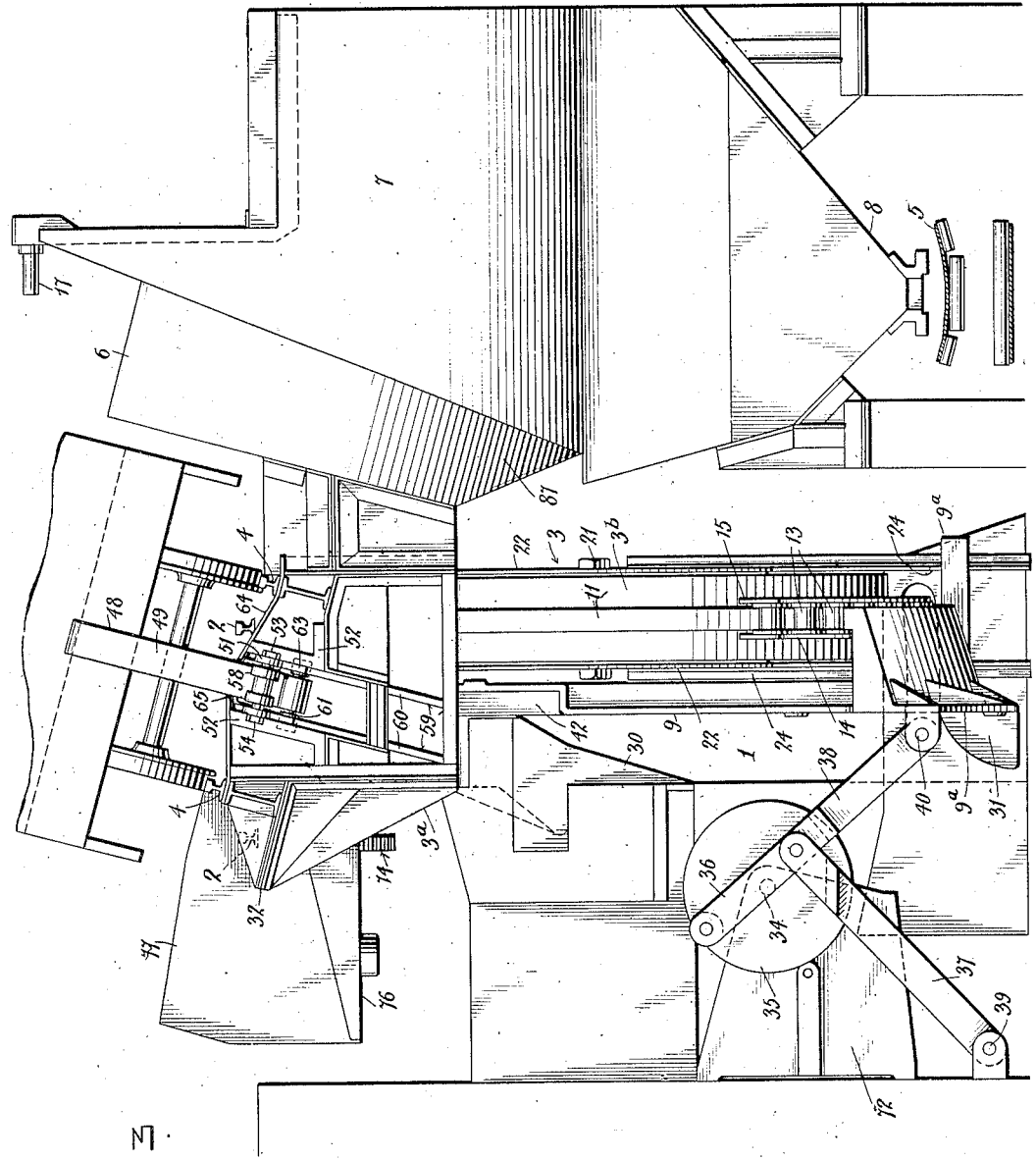
FIG. 3.
Inventor
Henry Richardson,
Witnesses
By 
Attorney

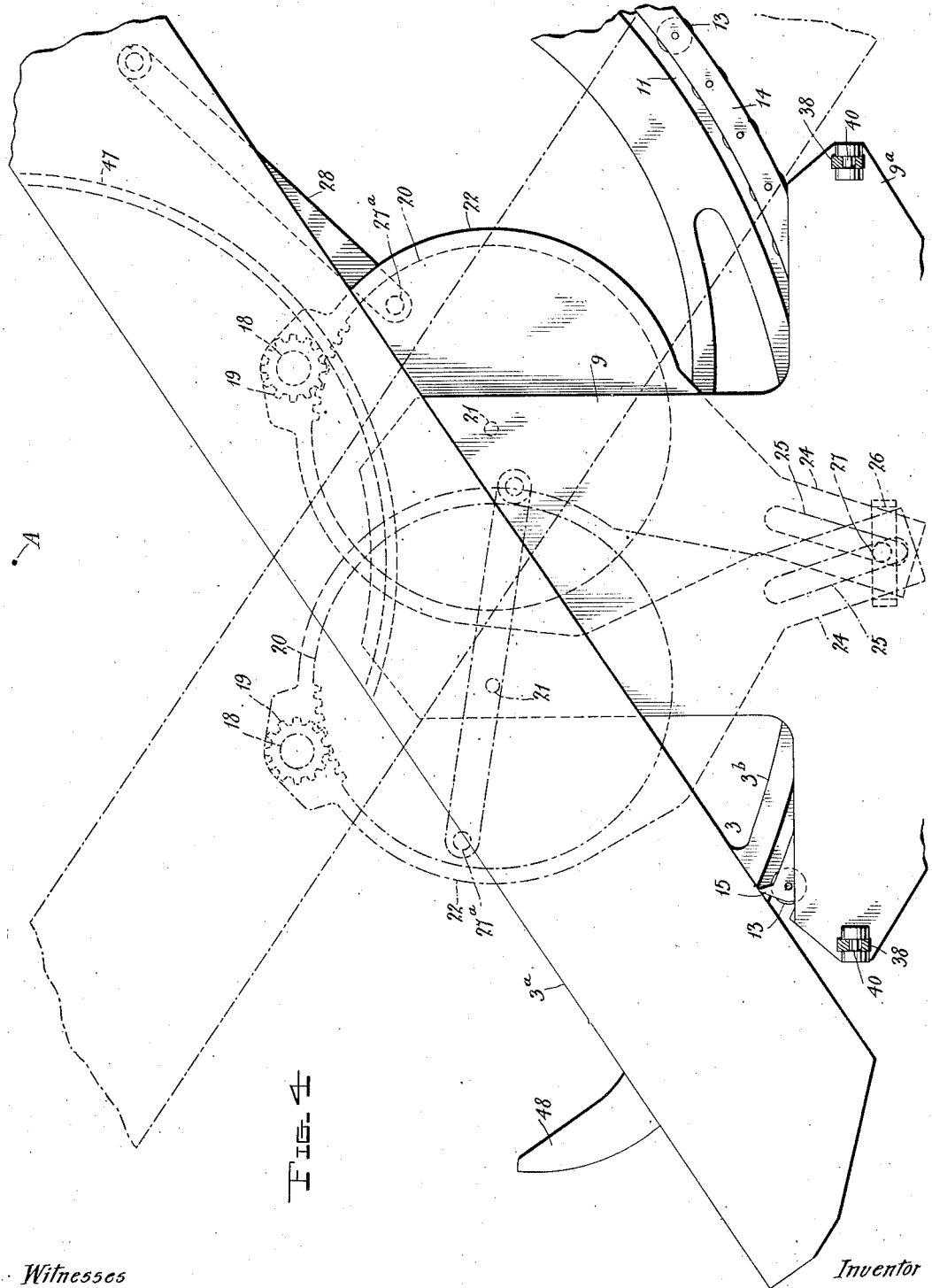

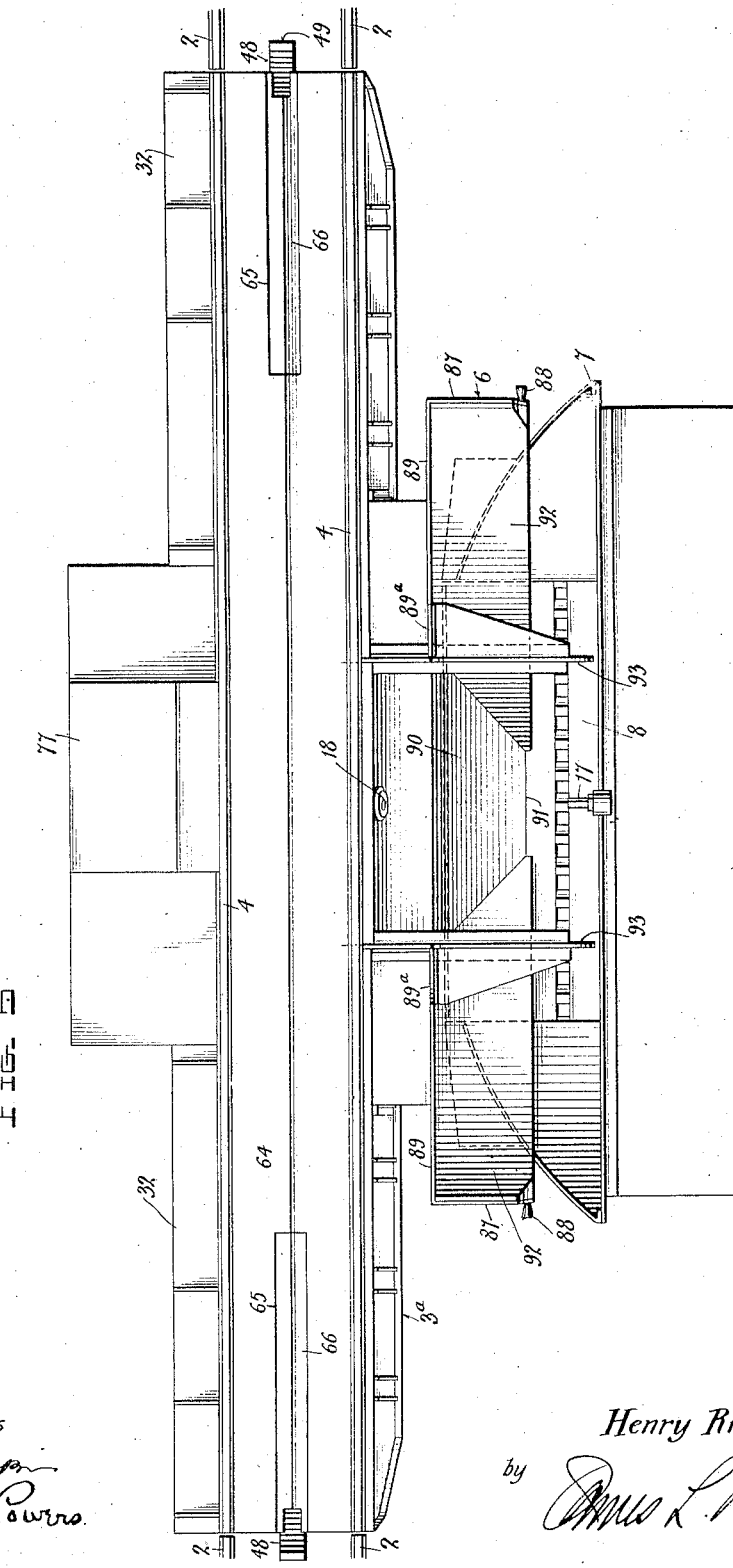

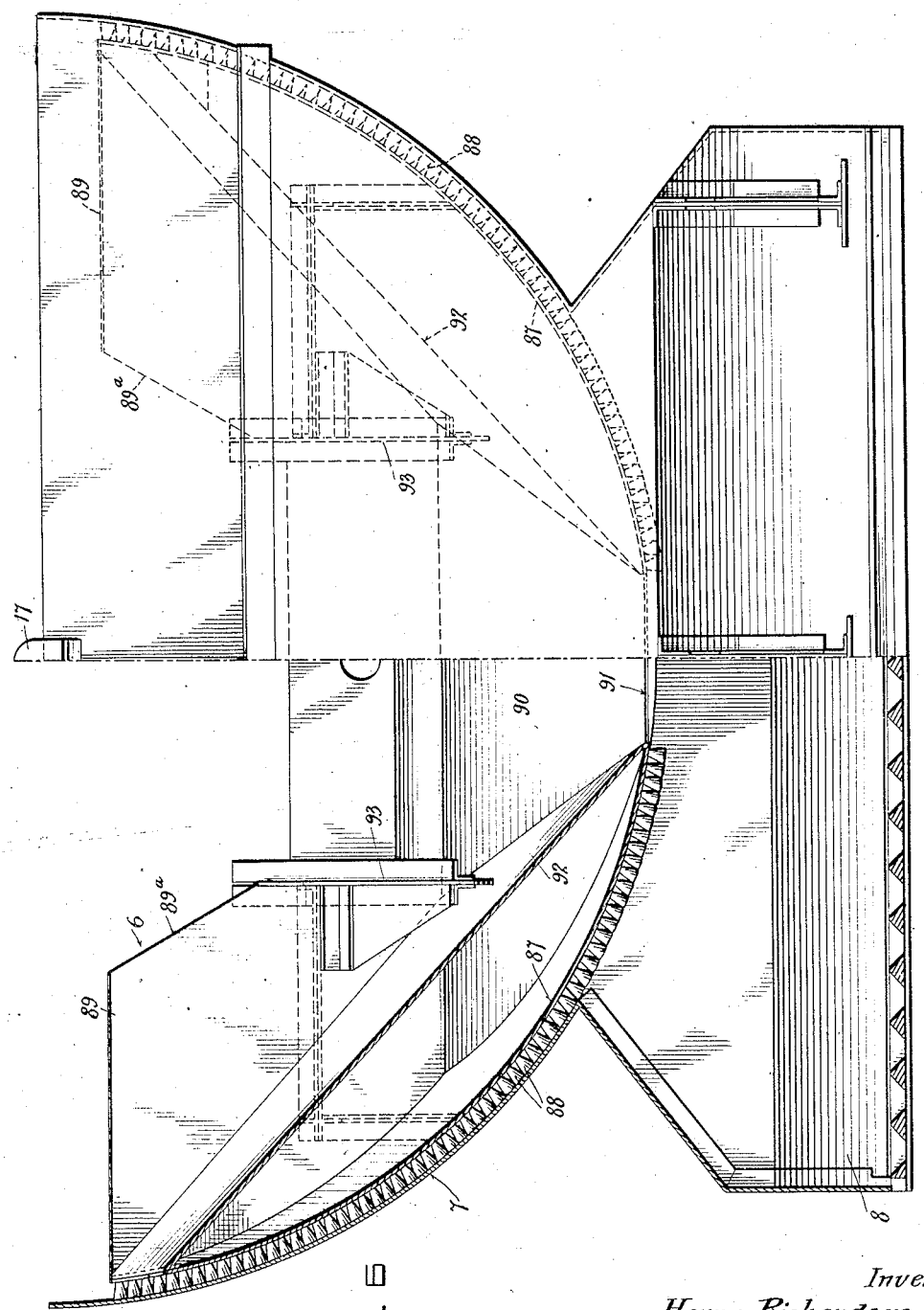

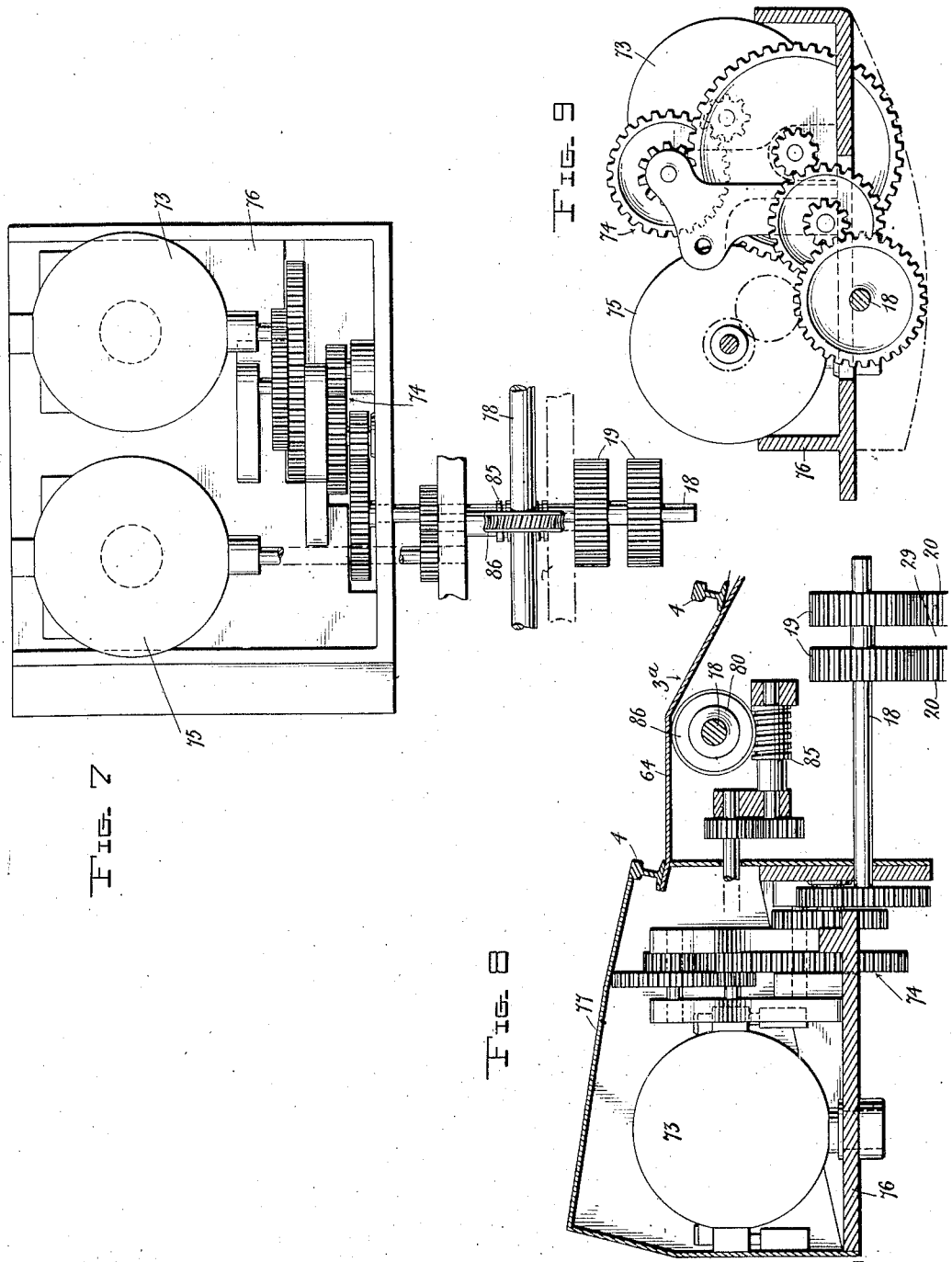

H. RICHARDSON.
CAR UNLOADER.
APPLICATION FILED MAY 28, 1919.
1,364,808.
Patented Jan. 4, 1921.
11 SHEETS—SHEET 8.
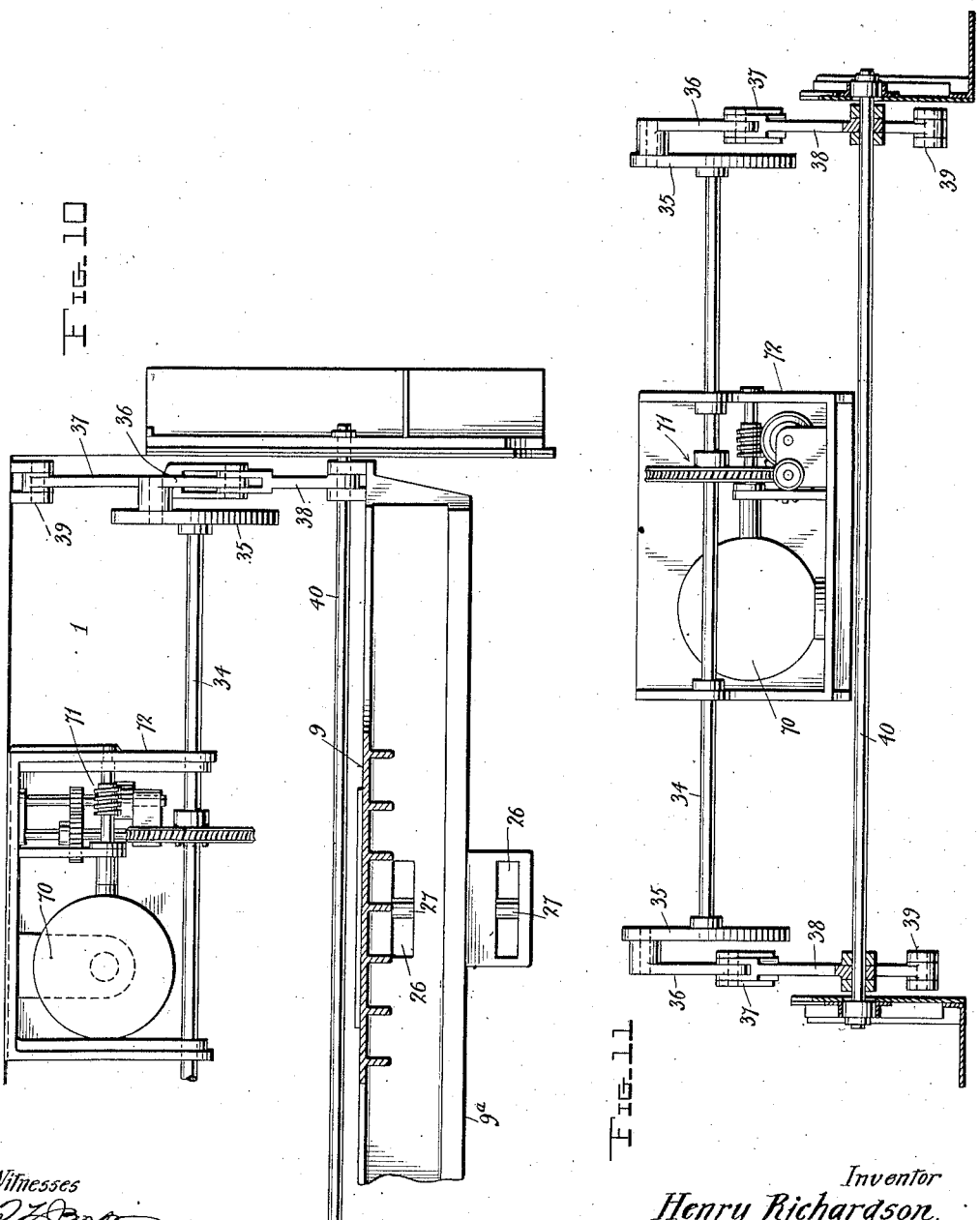
Witnesses
Inventor
Henry Richardson,
by
Attorney.

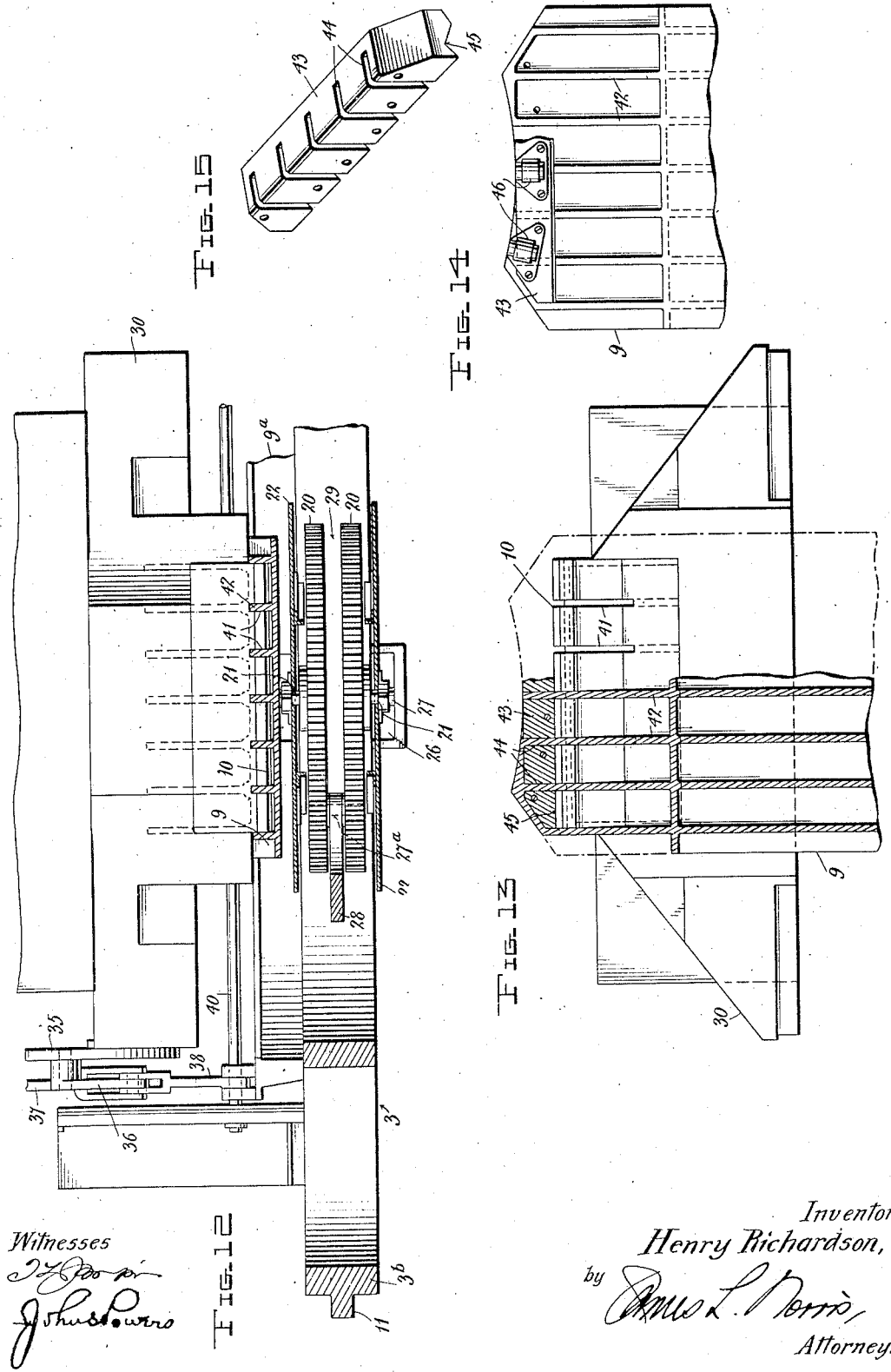

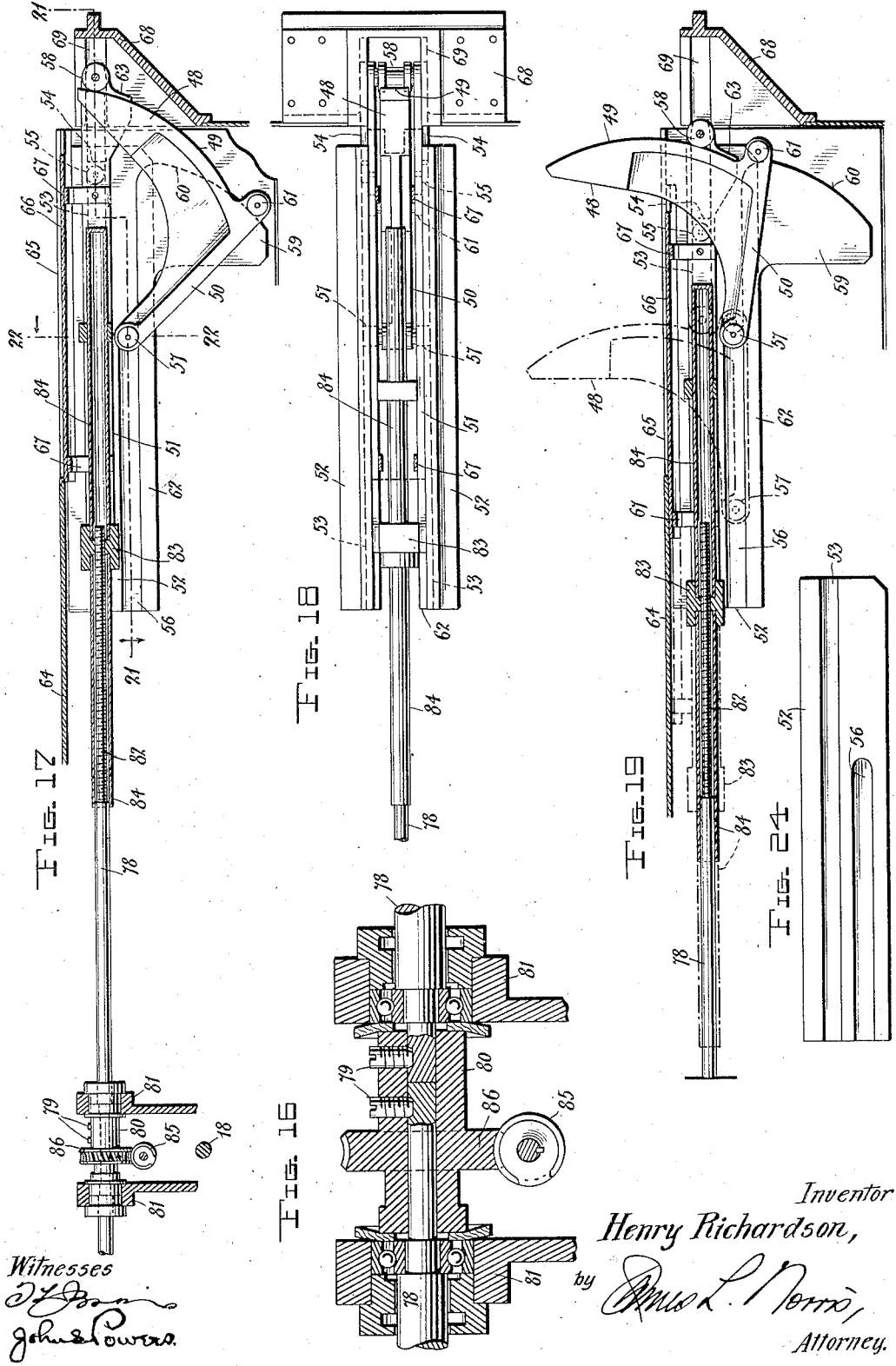

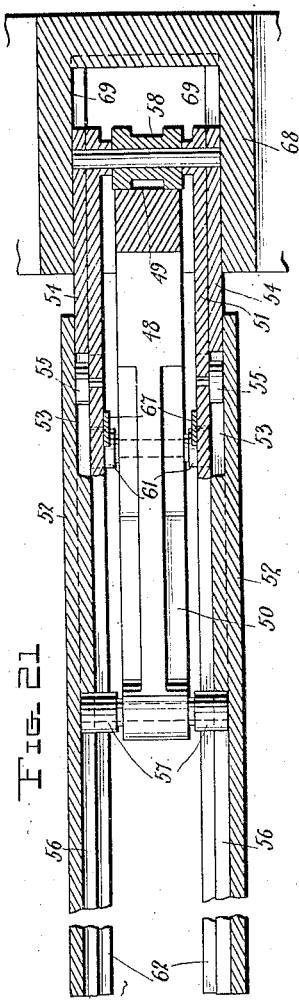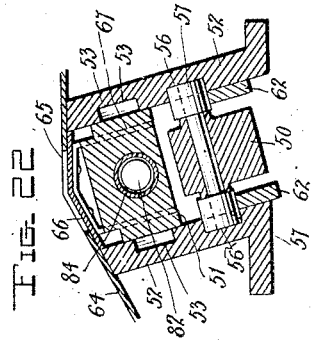

UNITED STATES PATENT OFFICE.

HENRY RICHARDSON, OF PASSAIC, NEW JERSEY.

CAR-UNLOADER.

1,364,808. Specification of Letters Patent. Patented Jan. 4, 1921.

Application filed May 28, 1919. Serial No. 300,246.

*To all whom it may concern:*

Be it known that I, HENRY RICHARDSON, a subject of the King of Great Britain, residing at Passaic, in the county of Passaic and State of New Jersey, have invented certain new and useful Improvements in Car-Unloaders, of which the following is a specification.

This invention relates to improvements in car unloaders, proposing a construction of that broad or general type wherein the car is tilted laterally about a longitudinal axis and is then tilted endwise about a transverse axis, first in one direction and then in the other, completely to discharge its contents through the central door, a prior art example of such broad or general type being furnished by my Letters Patent No. 1,264,859, granted April 30, 1918.

The objects of the invention, briefly stated, are to provide a car unloader which shall require a minimum degree of power for its operation and control; which at all times shall be effectively balanced whereby the operation is not attended with any destructive shocks; which shall reduce the transverse tilting movement of the car, both as to its amplitude and degree, to a minimum, thereby to eliminate any necessity for special supporting means at the sides of the car, and also to reduce the transverse space required for the unloading operation; which shall effect a coördination of the axes of the endwise and transverse tilting movements of the car whereby the unloader may be directly employed for the operation of a car door opener and whereby the said door opener may be effective in any position which the car may assume about the transverse axis of its endwise tipping movement; which shall, while eliminating superstructure, provide for the endwise tilting of the car about a fixed transverse axis centrally located in line with the car, preferably coincident with the floor of the car, thereby to secure favorable power distribution effects and to reduce to a minimum the longitudinal space required for the endwise tilting of the car; which shall secure an extremely favorable location of the operating parts, i. e., a location in which said parts are disposed within but well above the bottom of the pit in which the unloader operates and, hence, will not become fouled by any accumulation of material within the pit; which shall effect automatically the discharge of a maximum quantity or degree of the contents of the car and shall substantially avoid any loss by waste or leakage during the unloading operation; and whose operations may be controlled from a distant point.

With the above objects in view, the invention consists in certain features of structure, combination and relation which will be set forth in detail as the description proceeds.

An embodiment of the invention is illustrated in the accompanying drawings, wherein:

Fig. 3 is an end elevation conformable to Fig. 1 and showing the first stage of the unloading operation, viz: the initial lateral tilting of the car.

Fig. 4 is a detail diagrammatic elevation which shows the action of certain parts in connection with the operations of tilting the car endwise about the fixed tranverse axis.

Fig. 5 is a plan view conformable to Fig. 2, that is to say, showing the bridge in its normal position.

Fig. 6 is a view, partly in elevation and partly in vertical longitudinal section, showing details of the hopper structure.

Fig. 7 is a detail plan view, Fig. 8 a detail side elevation, and Fig. 9 a detail end elevation of the motors and associated gear structure for effecting and controlling the operations of the end bumpers and of the endwise tilting mechanism.

Fig. 10 is a detail plan view, and Fig. 11 is a detail elevation of the mechanism for effecting and controlling the transverse tilting operations.

Fig. 12 is a fragmentary horizontal sectional view showing details of the supporting member and the mechanism for effecting the transverse and endwise tilting operations.

Fig. 13 is a vertical longitudinal sectional view showing details of the structure of the supporting member.

Fig. 14 is a rear elevation of the same.

Fig. 15 is a detail perspective view of an element carried by the supporting member for coöperation with a knife edge bearing upon which the supporting member is mounted.

Fig. 16 is a detail cross-sectional view showing certain elements of the gearing for the operation of the end bumpers.

Fig. 17 is a detail longitudinal sectional view showing one of the end bumpers as in its normal position and the connections between the same and the gearing illustrated in Fig. 16.

Fig. 18 is a detail plan view, conformable to Fig. 17, of one of the end bumpers and its associated parts.

Fig. 19 is a detail longitudinal sectional view showing one of the end bumpers as being brought into position to engage a car.

Fig. 20 is a detail end elevation showing one of the end bumpers as fully raised and ready to engage a car.

Fig. 21 is a detail horizontal sectional view on the line 21—21 of Fig. 17.

Fig. 22 is a detail cross-sectional view on the line 22—22 of Fig. 17.

Fig. 23 is a sectional view showing details of certain elements of the means for operating the end bumpers.

Fig. 24 is a detail elevation of a guide plate employed as an element of the bumper operating means.

Similar characters of reference designate corresponding parts throughout the several views.

Figure 1:
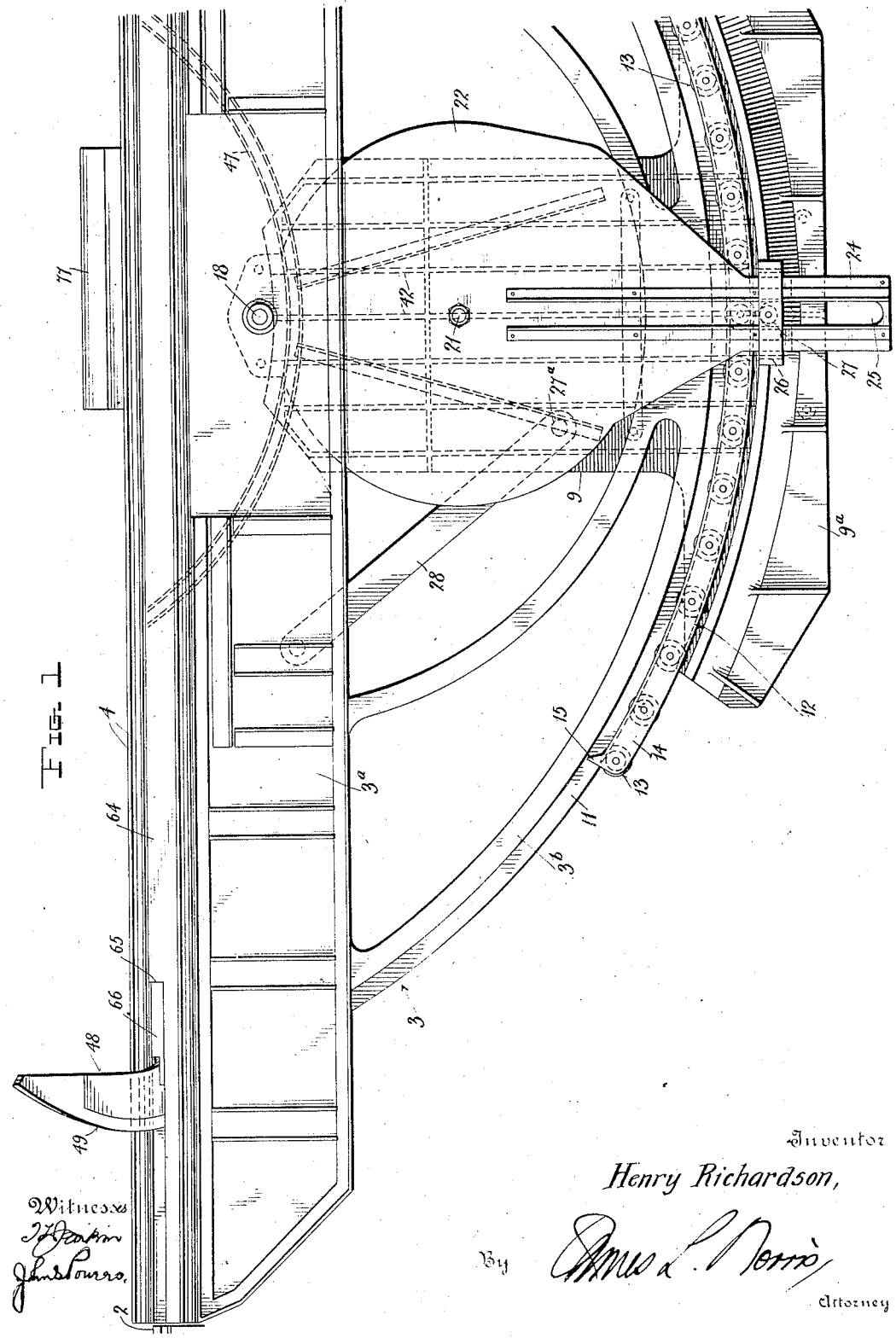
Figure 1 is a partial side elevation of a car unloader in which the features of the invention are incorporated, the hopper structure being omitted and the bridge upon which the car is carried being tilted transversely into an operative position.

The working parts are located in a pit 1 (Fig. 2) which forms an interruption of the track 2 (Figs. 3 and 5), the space between the ends of the pit being normally occupied by an element 3 (Fig. 1) which may be conveniently referred to as a bridge and which operates as a car platform, being provided with rails 4 which, at times, coöperate with the track 2. The material which is discharged from the car is delivered to a conveyer 5 of any suitable construction and arrangement but which, as shown, operates adjacent the floor of the pit. The bridge 3 normally occupies a position in which the rails 4 aline with the tracks 2, in which position a car to be unloaded is moved upon said bridge from either end of the pit. To effect the unloading of the car the bridge is tiltable about transverse and longitudinal axes. The car discharges into a hopper 6 supported adjacent said bridge and preferably movable with the bridge in accordance with the principles set forth in my said Patent No. 1,264,859. The hopper 6 operates with relation to a stationary hopper 7 whose lower portion is fashioned to provide a discharge spout 8 under which the conveyer 5 is movable; and certain features of the invention, as will be hereafter set forth, are concerned with the structure and coöperating relation of the hoppers 6 and 7.

According to the invention, the bridge 3 is supported by a member 9 and is tiltable transversely with said member, and longitudinally relatively to said member. The member 9 is located at one side of the bridge and is pendent from a supporting bearing 10, preferably a knife edge bearing, whose position determines the location of the axis of the transverse tilting movement. Such axis is located near the upper portion of the bridge and substantially remote from the lower end of the member 9 but at a distance below the rails 4 whereby the car will have a lateral tilt of approximately 15 degrees and at the level of its floor will be projected laterally. As thus projected the car may coöperate with a door opener, not shown in this present application. The axis of the lateral tilting movement is also preferably located in or close to a downward extension of the central longitudinal plane of the car, which feature in connection with the relative elevation of said axis as above described insures that the lateral tilting of the car shall be effected and controlled with a minimum degree of power.

The bridge 3 includes a body 3ᵃ and a sub-structure 3ᵇ which may be conveniently referred to as a keel and which is disposed below and in the plane of the body 3ᵃ. The bridge is supported from the member 9 by means of the keel 3ᵇ, the weight of the bridge and its associated operating parts being directed to the lower end of said member, and for such purpose the member 9 has at its lower end a laterally projecting flange 9ᵃ. The bridge 3, as stated, is tiltable endwise relatively to the supporting member 9, and for the purpose of its endwise movement, the keel 3ᵇ is provided with a track or engaging element 11 of suitable curvature to which the flange 9ᵃ or the coöperating part of said flange conforms, said flange preferably having a similar track or engaging element 12. An anti-friction roller system is provided between the elements 11 and 12 and preferably comprises cylindrical rollers 13 and bars 14 by which said rollers are carried, the bars 14 being disposed at the sides of the elements 11 and 12 and conforming to the curvature thereof. The anti-friction roller system, constructed as described, is freely slidable relatively to the elements 11 and 12 during the movements of the keel 3ᵇ; and the bars 14 are preferably provided at their ends with upward extensions 15 against which the under side of the bridge body 3ᵃ impinges when the bridge has been tilted endwise to its limit in either direction, the extensions 15 positively arresting the further movement of the bridge body and preventing it from striking the end of the flange 9ᵃ.

According to the invention, the car unloader is constructed whereby the car in its endwise movement will be tilted about a fixed transverse axial center A (Fig. 4), hereinafter referred to as an "axis" and which passes through the car body and is preferably substantially coincident with its floor; and the arc along which the track elements 11 and 12 are curved has the axis A as its radial center. One advantage of this location of the said transverse axis is that the door opener may be pivotally mounted on a coincident axis 17 which is carried by the upright side wall of the fixed hopper 7, and may thus participate in, and be effective at all times throughout, the endwise tilting movements of the car. In order that the car may be tilted about a fixed transverse axis as described it is necessary that the transverse axis about which the bridge 3 has its endwise movement shall be a shiftable one and shall move relatively to the said fixed transverse axis A as a radial center. In connection with this feature and according to the invention the purchase for the endwise movement of the bridge 3 is obtained from the supporting member 9 and not from the ground or from stationary parts secured to the ground as in all previous constructions of which I am aware, the advantages of utilizing the member 9 in the application of power for the endwise tilting movement of the bridge 3 being the favorable location above described of the longitudinal axis provided by the bearing 10, the easy control of the transverse tilting movement of the bridge and car, the superior counter-balancing effects in connection with all movements, the elimination of superstructure, the simplicity and small power requirements of the mechanism for producing the endwise tilting operation and the favorable location of said mechanism in the pit whereby it will not become fouled by any accumulation of material upon the bottom of the pit.

The mechanism for effecting the endwise tilting movements of the bridge 3 is preferably of the construction disclosed and includes a transverse main shaft 18 journaled in the side plates of the bridge body 3ª and constituting the axis about which the bridge has its endwise oscillation and epicyclic gearing operated by said shaft. Between the side plates in which it is journaled the shaft 18 carries a pair of fast pinions 19 which mesh with large spur wheels 20 mounted on an axis 21. The spur wheels 20 are supported by and between a pair of plates 22, constituting hangers, which are pendent from and oscillate about the shaft 18 (or bushings concentric to said shaft) as an axis. The hangers 22 are located adjacent the opposite sides of the keel 3ᵇ and are provided with extensions 24 in which are formed slots 25 disposed radially with respect to the shaft 18. The flange 9ª is provided with suitable open guides 26 (Figs. 1 and 2) through which the extensions 24 project, said guides being provided with transverse abutments 27 (preferably in the form of friction rollers) which project through the slots 25 and co-act with the walls of said slots. The spur wheels 20 rotate together and are connected by a cross pin 27ª to which is fitted one end of a link 28 operating in the space 29 between said spur wheels and having its other end pivoted to the bridge body 3ª.

The shaft 18 is driven from a suitable motor by means of gearing to be hereafter described, and, in the construction shown, the direction of its rotation governs the direction in which the endwise tilting of the bridge 3 is effected. In the construction disclosed, fully two-thirds of a revolution of the spur wheels 20 is available for producing the endwise tilting movements of said bridge and said spur wheels and the link 28 secure the advantages of a toggle action. The operation will be more clearly understood by reference to Figs. 1 and 4. Fig. 1 shows the parts of the mechanism for the endwise tilting operation in their normal position, and, with reference to said figure, a counter-clockwise rotation of the shaft 18, producing a clockwise rotation of the spur wheels 20, will elevate the left end of the bridge and lower its right end as shown in full lines in Fig. 4, while a clockwise rotation of said shaft, producing a counter-clockwise rotation of said spur wheels 20 will, of course, elevate the right end of the bridge and lower its left end as shown in broken lines in Fig. 4. Since the hangers 22 which carry the spur wheels 20 are pivoted co-axially with the shaft 18 and at their lower ends have sliding and pivotal engagement with the abutments 27, it follows that during the rotation of the spur wheels 20 in either direction as described, said hangers 22 re-act against the abutments whereby the spur wheels, through the link 28, are effective to produce the tilting movements of the bridge 3 as described; since the arcs along which the track elements 11 and 12 are curved have as their radial center the fixed transverse axis A located above the shaft 18 and about which the car is tilted in the endwise direction it follows that as the bridge 3 is tilted endwise in the manner described the axis of its tilting movement which is constituted by the shaft 18 shifts from one side to the other, as shown in Fig. 4, about said fixed axis as a radial center and according to the direction in which the bridge 3 is tilted.

Figure 2:
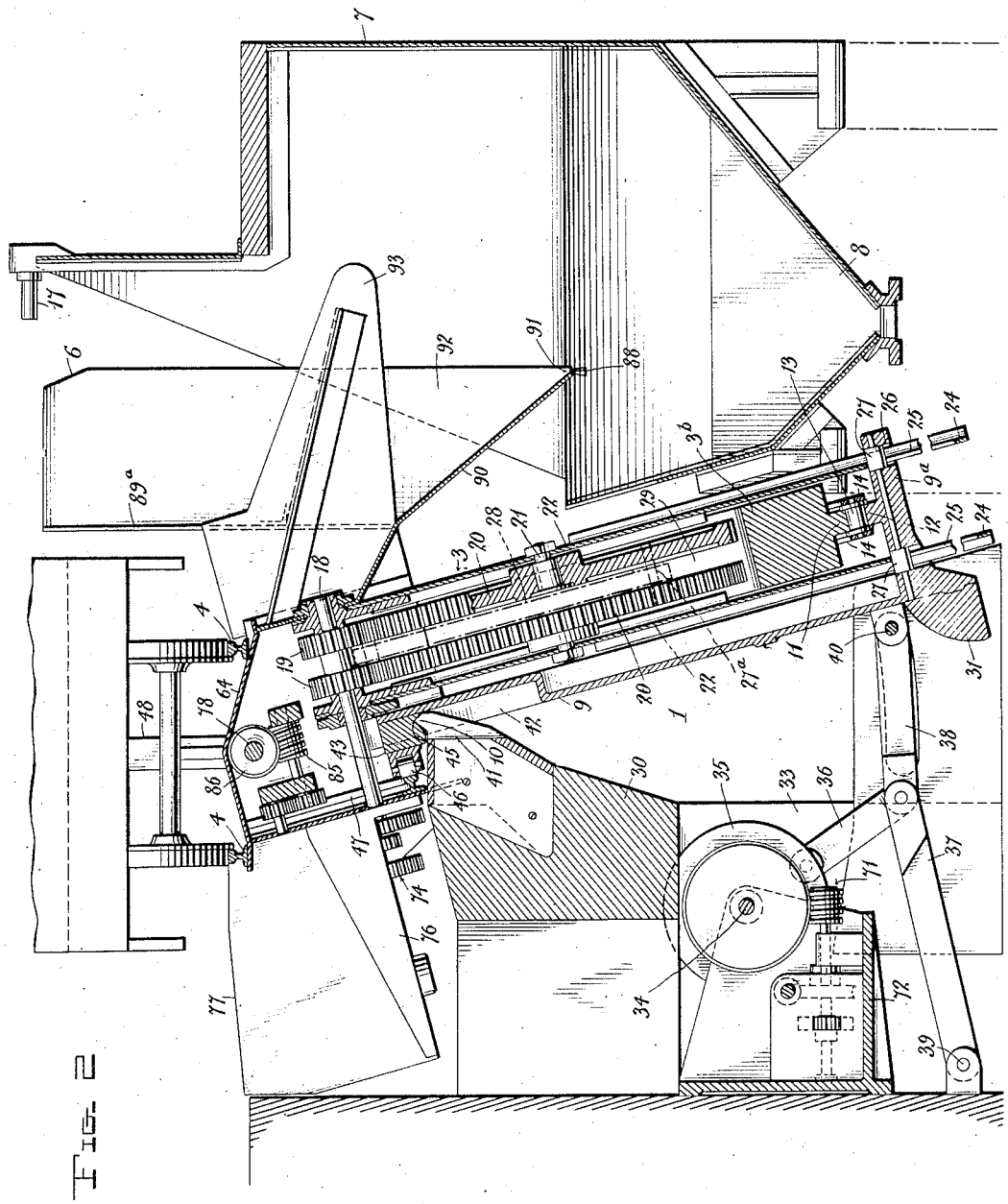
Fig. 2 is a central cross-sectional view of the unloader with the bridge in the normal position wherein the track rails aline with the permanent tracks which adjoin the ends of the unloader.

The bearing 10 upon which the supporting member 9 is mounted is an out-borne or overhanging bearing and is secured to a foundation 30 (Fig. 2) projecting from the adjacent side of the pit 1. The member 9 occupies a plane at a slight angle to an extension of the central longitudinal plane of the car whereby said member and the bridge 3 whose longitudinal plane is parallel to the plane of the member 9 will project downward and laterally toward the hopper 7 from the said extension plane as shown in Figs. 2 and 3. By virtue of such relation, the weight of the member 9 and of the parts associated with said member and located below the axis of the bearing 10 will assist the sidewise tilting of the car from the normal position, as shown in Fig. 2, to the unloading position, as shown in Fig. 3. It is preferred, however, that the lower end of the member 9 shall be provided at the side opposite the bridge 3 with a suitable weight 31 which assists the return of the parts, in the sidewise direction, to their normal positions when the unloading operation has been completed and the car has been brought to horizontal position, and which, without reliance on positive mechanism, maintains the supporting member and the other parts of the unloader in the normal position shown in Figs. 2 and 4, wherein the flanges 32 (Fig. 5) provided along the rear or outer side of the bridge body 3ª rest upon suitable sub-lateral supports along the edges of the pit. The foundation 30 which carries the out-borne bearing 10 is formed with an under-cut recess 33 in which is mounted the motor and gear elements for controlling and effecting the lateral movements of the bridge. Such gear elements will be described in full at a later point but the gearing includes as its operating part a longitudinal shaft 34 provided with wheels 35 which are connected by links 36 to pairs of toggle arms 37 and 38, the arm 37 having its outer end pivoted as at 39 adjacent the wall of the recess 33 and the arm 38 being pivoted as at 40 to the member 9. When the bridge 3 is in its normal position, as shown in Fig. 2, the toggle arms 37—38 are substantially extended; the lateral movement of the bridge to tilt the car sidewise into its unloading position is effected by "breaking" the toggle, as shown in Fig. 3, such operation being aided by the weight of the car and effecting a movement of the supporting member 9 and the keel 3ª into a perpendicular position.

The bearing 10 is preferably provided with a number of vertical recesses 41 (Fig. 2) and the member 9 is provided with vertical ribs 42 which work in said recesses and prevent longitudinal displacement of said member relatively to said bearing. The member 9 is provided at its upper end with a wear block 43 (Fig. 15) having vertical recesses 44 which take over the ribs 42 and having along its under face a recess 45 which conforms to and takes over the knife edge of the bearing 10. The bridge 3 and member 9 are positively held against relative lateral displacement, preferably by abutments fitted to the rear side of the member 9 and engaging the adjacent side plate of the bridge body 3ª, these abutments including anti-friction rollers 46 (Figs. 2 and 14) which are arranged along a curve concentric to the curve of the elements 11 and 12 and operate against a track element 47 secured to the adjacent side plate of the bridge body 3ª.

The unloader structure includes means both for holding the car against endwise movement on the rails 4 and also for centering the car relatively to the bridge 3, the working elements of said means being bumpers 48 (Figs. 17 and 19). The bumpers 48, which are located one at each end of the unloader, normally occupy positions below the rails 4 so as to present no obstruction to the movement of the car upon said rails and in their operation are projected into the path of the car and are also moved into engagement with the ends of the car. As shown, said bumpers have an L-shaped outline and include a working portion 49 and an arm 50 extending at a substantial right angle from said working portion. The movements of each bumper are effected by a longitudinally slidable frame 51 in coöperation with vertical guide plates 52 disposed at the sides thereof, said guide plates being suitably secured to the framing of the bridge body 3ª. The guide plates 52 are provided in their inner faces and between their ends with longitudinal grooves 53 and the side bars of the frame 51 are guided by means of said grooves, being preferably provided with centering ribs 54 and also with anti-friction rollers 55, both of which fit in the grooves. The plates 52 are provided below the grooves 53 with grooves 56 parallel thereto and which extend to the rear ends of said plates from points somewhat in advance of the centers of the plates, and the arm 50 of the bumper 48 coöperates with the grooves 56 as a guide, for this purpose being preferably provided with anti-friction rollers 57 which work in said grooves and which normally have supporting engagement against the closed ends of said grooves as shown in Fig. 17. The working portion 49 of the bumper 48 is externally curved along an arc conforming to the path which said bumper describes in its pivotal movements and the curved external face of the portion 49 constantly bears against a cross-piece 58 at the front end of the frame 51, said cross-piece preferably being formed as an anti-friction roller. The pivotal movements of each bumper 48 are effected and prescribed by a pair of fixed cam cheeks 59 located below the plates 52 and having curved working edges 60. The bumper 48 works between the cheeks 59 and is provided with abutments 61, preferably in the form of friction rollers, which engage the curved edges 60 of said cheeks, said abutments being preferably located at the external angle of the arm 50 with the working portion 49. The cheeks 59 are preferably formed at the front ends and as co-planar downward extensions of guide rails 62 which are secured to and extend substantially the length of the plates 52 and whose upper or bearing edges are flush with the lower walls of the grooves 56 and adjoin the curved edges 60 at an easy angle. The bumper 48 occupies its normal lowered position, as shown in Fig. 17, when the frame 51 is projected to the limit of its outward movement; and said frame in its inward movement causes the operation of said bumper by reason of the engagement of its cross-piece 58 with the working portion 49 of the bumper. The frame 51 during the first portion of its inward movement co-acts with the cam cheeks 59 to raise the bumper about the rollers 57 as a fulcrum, whereby the bumper will be brought into the path of the car, as shown in Fig. 19. As the frame 51 continues its inward movement it carries with it the elevated bumper, which is thus moved longitudinally of the bridge 3 into engagement with the end of the car, the rollers 61 working upon the upper edges of the rails 62. The bumpers are operated simultaneously at both ends of the unloader, and, starting from the same relative positions, are moved at a uniform rate; hence, they are effective to center the car relatively to the bridge 3; that is to say, if the car is nearer one end of said bridge than the other, the bumper nearer the car will push the car toward the other bumper, and it follows that when both bumpers come into engagement with the car, they will have centered the car on the bridge. The side bars of the frame 51 are provided at their front ends but slightly inward of the cross-piece 58 with depending lugs 63 and when the bumper is fully raised (see the broken lines of Fig. 19) the abutments 61 will engage at the front of the lugs 63. The bumpers are, of course, reset by the outward movements of the frames 51 and during such outward movements the lugs 63 act on the abutments 61 to cause the bumpers to follow the frames 51. As soon as the rollers 61 reach the curved edges 60 the bumpers start to drop by gravity, reaching their normal positions at the time the outward movements of the frames 51 are completed.

It is desirable that the frames 51 and the guide plates 52 as well as the gearing for the operation of said frames should be covered and thus protected, and for this purpose, the bridge body 3ᵃ is provided with a cover plate 64 which at its ends has longitudinal recesses 65 to accommodate the bumpers 48 during their movements with the frames 51. The recesses 65 are normally closed by removable panels 66 which are fitted under the plate 64 and are supported upon straps 67 carried by the frames 51, said panels normally sliding with said frames and during their sliding movements exposing or occluding the recesses 65, as the case may be.

It is also preferred to utilize the frames 51 and bumpers 48 for positively locking the bridge 3 in its normal position, and for this purpose said frames and bumpers normally project beyond the outer ends of said bridge and are engaged in keepers 68 which are fitted in the end walls of the pit 1, said keepers preferably being in the form of metal casings and having their side walls provided with grooves 69 which form continuations of the grooves 53 and in which the ribs 54 engage, as clearly shown in Fig. 21.

The various operations of the unloader are preferably effected by separate electrical motors of the reversible type which may be controlled from a common station. Thus, the operations of a battery of the unloaders located at a terminal may be under the control of a single attendant occupying a tower or observation post, (not shown) similar to a switch tower, in which the controllers (not shown) for the several unloaders may be arranged.

The lateral movements of the supporting member 9 may be effected by a motor 70 (Figs. 10 and 11), connected by suitable reducing gearing 71 to the shaft 34, and, together with said gearing and shaft, carried by a supporting bracket 72 disposed within the recess 33.

The endwise tilting movements of the bridge 3 may be effected by a motor 73 (Fig. 7) which is connected by suitable reducing gearing 74 to the shaft 18. The operations of the bumpers 48 may be effected by a motor 75. The motors 73 and 75 are preferably mounted in adjacency upon a suitable bracket 76 which also supports the gearing 74 and which is rigidly secured to the side of the bridge body 3ᵃ remote from the hopper 6, and said motors and their associated gear elements are preferably inclosed by a casing 77 secured to said bracket.

The sliding movements of the frames 51, as above described, are preferably effected by a longitudinal shaft 78 arranged under the cover plate 64 and which, as a matter of convenience, may be made in alining sections connected by screws 79 (Fig. 16), or in other suitable manner, to a coupling sleeve 80, the sections of said shaft being preferably mounted in suitable bearings 81 of the end thrust type between which the coupling sleeve is disposed. The shaft 78 has its end portions reversely threaded as at 82 through a suitable distance and the frames 51 have their inner ends formed with nuts 83 for coöperation with the threaded portions 82. Said frames also carry at opposite sides of the nuts 83 projecting sleeves 84 which at all times inclose the threaded portions 82 and protect them against dust. The gearing between the motor 75 and the shaft 78 preferably consists of a worm 85 geared to the shaft of said motor and a worm wheel 86 on the sleeve 80 and in mesh with said worm. It will be obvious that as the shaft 78 is rotated, the frames 51 will be moved in opposite directions and that the rotation of the shaft 78 in one direction will produce inward movements of said frames while the rotation of said shaft in the opposite direction will produce outward movements of said frames.

The hopper 6 in the endwise tilting of the car operates concentrically between the sides of the hopper 7 and is formed externally as at 87 (Fig. 6) along an arc concentric to the fixed transverse axis about which the car is oscillated and to which the hopper 7 conforms. The curved external faces 87 may, if desired, be provided with brushes 88 which wipe against the inner faces of the adjacent sides of the hopper 7 and serve to dislodge any of the material being unloaded, such as grain or finely reduced substances, which, perchance, may have worked into the spaces between the sides of the hoppers. The hopper 6 is open at its front and has a rear wall 89 which is in a plane parallel to the longitudinal plane of the car and is formed with a central clearance 89$^a$ through which the material in the car may fall. Said hopper is also provided with a central discharge apron 90 which extends at an angle from its rear wall to a central discharge clearance or opening 91 between the side walls and at the lowest point of the hopper. Said hopper is provided at its sides with deflectors 92 which converge toward the opening 91 and in conjunction with the apron 90 serve to direct the material being unloaded through said opening. It is to be noted that the apron 90 projects below the upper edge of the rear wall of the hopper 7 whereby when the hopper 6 is in its inclined operative position (Fig. 3) said apron will coöperate with said rear wall as a seal and, in conjunction with the sides of the hopper 6, will substantially prevent any leakage of material in the event of an over-load in the hopper 7. The capacity of the portion of the hopper 7 below the hopper 6 in conjunction with the discharge capacity of the conveyer 5 is such that an over-load of material in the hopper 7 is extremely unlikely, and it may, therefore, be said that the liability of loss of any of the material by leakage from the hopper 7 is negligible.

Within the hopper 6 are a pair of forwardly projecting arms 93 which are designed for coöperation with the door opener previously referred to, and in this connection it may be noted that the arms 93 present no substantial obstruction to the flow of material into and through the hopper 6.

Fig. 5 shows the unloader in its normal position wherein the rails 4 aline with the rails 2. In such position, a car is pushed upon the rails 4 from either of the tracks 2 and is centered relatively to the bridge 3 by means of the bumpers 48, said bumpers being engaged with the ends of the car by inward movements of the frames 51 in the manner above described. When the car has thus been centered on the bridge 3 and secured by the bumpers, the motor 70 is operated to move the supporting member 9 laterally about the knife edge 10 as a bearing, such movement of the supporting member being from the normal position shown in Fig. 2 to a position, as shown in Fig. 3, wherein said supporting member is perpendicular. The bridge 3 participates in the movement of the supporting member and thereby moves the car to a laterally tilted position wherein its floor is inclined downward toward the hopper 7, the relation between the floor of the car and the hopper 6 being constant by virtue of the fact that the hopper 6 is carried by and moves with the bridge 3. Substantially one-third of the cargo will be discharged in the laterally tilted position of the car through its open side door. Thereupon, maintaining its laterally tilted position, the car is then tilted endwise in one direction about the transverse axis A through the operation of the motor 73. During and upon the completion of the said endwise tilting movement substantially a third of the original cargo will be discharged from the elevated end of the car through the open door. When the material has been completely discharged from the elevated end of the car, the motor 73 is operated to tilt the car endwise in the opposite direction, thereby similarly to elevate the opposite end of the car and similarly discharge the remainder of the cargo. It is to be noted that during the second endwise tilting operation, the weight of the member 9 and the associated parts at the side of the axis 18 opposite the unloaded lower end of the car counterbalances the weight of the load remaining in the car and thus insures an easy reversal of the endwise tilting of the car. When the contents of the car have thus been completely discharged, the motor 73 is again operated to move the bridge 3 to a horizontal position, as shown in Figs. 3 and 4, whereupon the motor 70 is operated to move the member 9, and with it the bridge 3, from the operative position of Fig. 3 to the normal position of Fig. 2, the return movement of the member 9 being assisted by the weight 31. The bumpers 48 are then disengaged from the car and restored to their normal positions, upon which the car is removed from the bridge and the unloader is ready for another operation.

In the accompanying drawings are illustrated what is now considered as the best physical expression of my invention. The invention is, however, believed to be of considerable novelty in its particular field and may be resolved into various combinations of structural elements. For these reasons, physical expressions of the invention may have a somewhat wide range of relative modification, and it will accordingly be understood that the specific description above included of the preferred embodiment is not intended to impose any limitation upon the scope of the appended claims which does not inhere in the language thereof.

Having fully described my invention, I claim:—

1. A car unloader comprising a supporting member, a longitudinally disposed bearing from which said member is pendent and about which it may be rocked transversely, and a car-carrying bridge carried by said supporting member and whose weight is taken at the lower end of said member, said bridge participating in the transverse movements of said member and being mounted for tilting movement longitudinally in either direction relatively to said member.

2. A car unloader comprising a supporting member, a longitudinally disposed knife-edge bearing from which said member is pendent and about which it may be rocked transversely, and a car carrying bridge carried by said supporting member and whose weight is taken at the lower end of said member, said bridge participating in the transverse movements of said member and being mounted for tilting movement longitudinally in either direction relatively to said member.

3. A car unloader comprising a car carrying bridge, a supporting member for said bridge pendent from a longitudinal bearing located below the upper side of the bridge about which said member may be rocked transversely, the weight of the bridge being taken at the lower end of the supporting member and the bridge participating in the transverse movements of said member and means located below the upper side of the bridge for tilting the bridge in either direction longitudinally of the supporting member.

4. A car unloader comprising a supporting member tiltable transversely about a longitudinal axis, a car carrying bridge carried by said supporting member and participating in the transverse movements thereof and means re-acting on the bridge and the supporting member for tilting the bridge longitudinally of the supporting member in either direction.

5. A car unloader comprising a supporting member tiltable transversely about a longitudinal axis, a car carrying bridge carried by said supporting member and participating in the transverse movements thereof and means re-acting on the bridge and the supporting member and participating in the transverse movements thereof for tilting the bridge longitudinally of the supporting member in either direction.

6. A car unloader comprising a supporting member, a longitudinally disposed bearing from which said member is pendent and about which it may be rocked transversely, a car carrying bridge carried by said supporting member and whose weight is taken at the lower end of said member, said bridge participating in the transverse movements of said member and being mounted for tilting movement longitudinally in either direction relatively to said member, and means re-acting on the bridge and the supporting member and participating in the transverse movements thereof for tilting the bridge longitudinally relatively to the supporting member.

7. A car unloader comprising a supporting member, a longitudinally disposed bearing from which said member is pendent and about which it may be rocked transversely, a car carrying bridge supported by said member and participating in the transverse movement thereof, said bridge being tiltable longitudinally relatively to said member and a longitudinally directed track element at the lower end of said member and which prescribes the longitudinal movement of said bridge, said track element being curved along an arc which has a fixed radial center located above and normally central of the bridge.

8. A car unloader comprising a supporting member, a longitudinal bearing from which said member is pendent and about which it may be rocked transversely, and a car carrying bridge, said member having at its lower end a flange which takes the weight of said bridge and upon which said bridge may be tilted in either direction longitudinally of said member, said bridge participating in the transverse movements of said member.

9. A car unloader comprising a supporting member, a longitudinal bearing from which said member is pendent and about which it may be rocked transversely and a car carrying bridge carried by and tiltable longitudinally of said member, the latter having at its lower end a laterally projecting flange which takes the weight of said bridge and said flange having a track element curved along an arc which has a fixed radial center located above and normally central of said bridge and which prescribes the tilting movement of said bridge relatively to said member, said bridge participating in the transverse movement of said member.

10. In a car unloader the combination of a car-carrying bridge, an outborne longitudinal bearing located below the upper side of the bridge and in an extension of the substantial central longitudinal plane of the car, and a supporting member pendent from the bearing and projecting laterally downward with reference to said plane, said member being tiltable transversely about said bearing and at its lower end taking the weight of said bridge.

11. In a car unloader the combination of a car-carrying bridge, an outborne longitudinal knife-edge bearing located below the upper side of the bridge and in an extension of the substantial central longitudinal plane of the car, and a supporting member pendent from the bearing and projecting laterally downward with reference to said plane, said member being tiltable transversely about said bearing and at its lower end taking the weight of said bridge.

12. In a car unloader the combination of a car-carrying bridge, an outborne longitudinal bearing located below the upper side of the bridge and in an extension of the substantial central longitudinal plane of the car, and a supporting member pendent from the bearing and projecting laterally downward with reference to said plane, said member being tiltable transversely about said bearing and at its lower end taking the weight of said bridge, and said bridge participating in the transverse movements of said member and being also tiltable longitudinally relatively to said member.

13. In a car unloader the combination of a longitudinal knife-edge bearing provided with transverse recesses, a supporting member pendent from and transversely movable about said bearing and having ribs working in said recesses, and a car-carrying bridge carried by said supporting member, said bridge participating in the transverse movements of said member and being tiltable in either direction relatively to said member.

14. In a car unloader the combination of a supporting member mounted to rock transversely about a longitudinal axis, a car carrying bridge carried by said supporting member for participation in the transverse movement thereof and tiltable in either direction longitudinally relatively to said member about a transverse axis and means for causing the said transverse axis during the tilting of the bridge thereon, to shift about a fixed transverse axis located above and normally central of the bridge.

15. In a car unloader the combination of a car-carrying bridge, an outborne longitudinal bearing located below the upper side of said bridge, a supporting member pendent from said bearing and being transversely tiltable thereon, said member at its lower end taking the weight of said bridge and said bridge participating in the transverse movement of said member and being tiltable in either direction longitudinally relatively to said member about a transverse axis, and means for causing the said transverse axis, during the tilting of the bridge thereon, to shift about a fixed transverse axis located above and normally central of the bridge.

16. In a car unloader the combination of a car-carrying bridge tiltable longitudinally about a transverse axis and means for causing the said transverse axis to shift during the tilting of the bridge about a fixed transverse axis located above and normally central of the bridge.

17. In a car unloader the combination of a car-carrying bridge, an outborne longitudinal bearing located below the upper side of the bridge and in an extension of the substantial longitudinal plane of the car, a supporting member pendent from the bearing, said member being tiltable transversely about said bearing and at its lower end taking the weight of the bridge, the bridge participating in the transverse movement of said member and being also tiltable in either direction longitudinally relatively to said member about a transverse axis and means for causing the said transverse axis, during the tilting of the bridge thereon, to shift about a fixed transverse axis located above and normally central of the bridge.

18. In a car unloader, a car-carrying bridge, a transverse main shaft passing through the bridge and constituting an axis about which the bridge may be tilted in either direction, and epicyclic gearing operated by said main shaft and connected to the bridge to effect the tilting thereof about said main shaft.

19. In a car unloader, a car-carrying bridge, a supporting member which at its lower end takes the weight of the bridge and which is pendent from a longitudinal bearing, a transverse main shaft passing through the bridge and constituting an axis about which the bridge may be tilted in either direction longitudinally relatively to the supporting member, and epicyclic gearing operated by said main shaft and connected to the bridge and the supporting member to effect the tilting of the bridge about said main shaft.

20. In a car unloader, a car-carrying bridge, a transverse main shaft passing through the bridge and constituting an axis about which the bridge may be tilted in either direction, a hanger pivotally pendent from said shaft and having its lower portion formed with a slot extending radially with respect to said shaft, a fixed abutment projecting through said slot, a pinion on said shaft, a spur wheel carried by said hanger and in mesh with said pinion, and a link connecting said spur wheel and said bridge.

21. In a car unloader, a car-carrying bridge, a vertical wheel arranged below the upper side and in the plane of said bridge and movable during its rotation about a fixed transverse axis located above and normally central of said bridge, a link connecting said wheel and said bridge, means for rotating said wheel in either direction to tilt said bridge about a transverse axis, and means for causing the transverse axis about which the bridge is tilted to shift, during the operation of said wheel, about the said fixed transverse axis.

22. In a car unloader the combination of a bridge mounted from below to tilt about a transverse axis shiftable about a fixed transverse axis located above and normally central of the bridge, means for tilting the bridge about said first-named transverse axis and means for causing said first-named transverse axis, during the shifting of the bridge, to shift about said fixed transverse axis.

23. In a car unloader the combination of a supporting member pendent from a longitudinal bearing, a car-carrying bridge carried by said supporting member and means for operating the supporting member about said bearing comprising toggle links, one having an anchored pivot and the others pivoted to said supporting member, and an operating wheel connected to said toggle links.

24. In a car unloader, the combination of a member pendent from a longitudinal bearing and a car-carrying bridge comprising a body located above said member and a keel depending from said body, at one side of said member, said keel being supported by said member for longitudinal tilting movement.

25. In a car unloader, the combination of a member pendent from a longitudinal bearing, a car-carrying bridge comprising a body located above said member and a keel depending from said body at one side of said member and engaging said member as a support, said keel having a rocking bearing at the lower end of said member.

26. In a car unloader, the combination of a member pendent from a longitudinal bearing, a car-carrying bridge comprising a body located above said member and a keel depending from said body at one side of said member, said keel being supported by said member for longitudinal tilting movement and anti-friction abutments located above said bearing between said body and the side of said member opposite to the side which adjoins said keel.

27. In a car unloader, in combination, a car-carrying bridge, a bumper at each end thereof comprising a working portion and an arm extending at an angle to said working portion, a frame slidable longitudinally of said bridge and having an end piece engaging said working portion, and a stationary guide having a groove extending from its rear end and having a closed front end, said arm having its end fitted in said groove, an abutment projecting from said working portion, said guide including a fixed cam and a guide rail projecting rearward from said cam and said abutment operating over said cam and guide rail.

28. In a car unloader, in combination, a car-carrying bridge, a bumper at each end thereof comprising a working portion and an arm extending at an angle to said working portion, a frame slidable longitudinally of said bridge and having an end piece engaging said working portion, and a stationary guide having a groove extending from its rear end and having a closed front end, said arm having its end fitted in said groove, an abutment projecting from said working portion, said guide including a fixed cam and a guide rail projecting rearward from said cam and said abutment operating over said cam and guide rail, said frame having a projecting lug over which said abutment engages when the bumper is raised.

29. In a car unloader, in combination, a car-carrying bridge, an element slidable longitudinally of said bridge at one end thereof, a bumper slidable with said element and also movable vertically relatively to said element, and stationary guide means in association with said element and bumper for causing vertical movement of the bumper substantially without longitudinal movement thereof during the initial period of movement of said element, continued movement of the latter causing longitudinal movement of the bumper.

30. In a car unloader, in combination, a car-carrying bridge, an element slidable longitudinally of said bridge at one end thereof, a bumper movable longitudinally with and also pivoted relatively to said element, stationary guide means with which said bumper coöperates for pivotal and longitudinal movement and including a cam part in coöperation with said bumper to cause a pivotal movement thereof substantially without longitudinal movement thereof during the initial period of movement of said element.

31. In a car unloader, in combination, a car-carrying bridge, elements slidable longitudinally of said bridge at the ends thereof, a bumper slidable with each element and also movable vertically relatively to said element, stationary guide means in association with each element and its companion bumper for causing vertical movements of the bumper during a period of the movement of its companion element, a reversible shaft supported by and extending longitudinally of the bridge and having reversely screw threaded portions at its ends, and nuts formed with each element and engaging the respective threaded end portions of said shaft.

32. A car unloader having a car-carrying bridge tiltable endwise, a hopper located at one side of and participating in said movement of said bridge, said bridge in its said movement effecting tilting of the car about a transverse axis, said hopper being externally curved along an arc having said axis as its center and having a discharge opening, and a receiving hopper within which said tiltable hopper operates and which has walls curved conformably with the external curvature of said movable hopper and lying close to the curved external portion of said movable hopper.

33. A car unloader having a car-carrying bridge tiltable transversely and endwise, a hopper located at one side of and participating in the movements of said bridge, said bridge in its endwise movement effecting the tilting of the car about a fixed transverse axis, said hopper being externally curved along an arc having said axis as its radial center and having a central discharge opening interrupting its external curvature, a central discharge apron leading to said opening and lateral deflectors extending in convergent relation to said opening, and a stationary hopper within which said movable hopper operates and which has side walls curved conformably to the external curvature of said movable hopper and lying close to the curved external faces of said movable hopper and a rear wall below which said apron projects and which coöperates with said apron as a seal when the bridge is tilted transversely.

34. In a car unloader, a pendent supporting member having a laterally projecting flange provided with a longitudinally disposed track element, a car carrying bridge tiltable about a transverse axis and whose weight is taken by said supporting member, said bridge including a body and a longitudinally disposed keel depending from said body and having a track element, said track elements being coöperating companions and being concentrically curved about an arc having a radial center located above said supporting member, anti-friction rollers arranged between said track elements and bars by which said anti-friction rollers are carried.

35. In a car unloader, a pendent supporting member having a laterally projecting flange provided with a longitudinally disposed track element, a car carrying bridge tiltable about a transverse axis and whose weight is taken by said supporting member, said bridge including a body and a longitudinally disposed keel depending from said body and having a track element, said track elements being coöperating companions and being concentrically curved about an arc having a radial center located above said supporting member, anti-friction rollers arranged between said track elements and bars by which said anti-friction rollers are carried, said bars having terminal projections which engage said body from below at the limit of its movement in either direction.

36. In a car unloader, in combination, a car-carrying bridge tiltable relatively to an abutment adjacent to an end thereof, a car-bumper movable longitudinally and swinging vertically relatively to said bridge, an element movable longitudinally of the bridge and connected to the bumper to initially swing the bumper upwardly and to subsequently shift it longitudinally relatively to the bridge, and a keeper secured in said abutment and with which said element is adapted to coöperate to lock the bridge from tilting movement relatively to said abutment.

37. A car-unloader comprising a car-carrying bridge tiltable endwise about a transverse axis, a hopper located at one side of and participating in the endwise tilting movements of the bridge, said hopper having a periphery concentric with the said transverse axis and also having a discharge outlet, and a receiving hopper into which the hopper first mentioned fits rotatably, said receiving hopper having a wall curved conformably with and also coöperating with the concentric periphery of the first-mentioned hopper.

In testimony whereof I have hereunto set my hand in presence of two subscribing witnesses.

HENRY RICHARDSON.

Witnesses:
E. F. W. WHITE,
EDWARD BRENER.